(12) United States Patent
Takanashi et al.

(10) Patent No.: US 6,324,019 B1
(45) Date of Patent: Nov. 27, 2001

(54) LENS HOUSING HAVING APERTURE DEVICE

(75) Inventors: Tatsuo Takanashi; Mitsuhiro Sato, both of Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/512,586

(22) Filed: Feb. 24, 2000

(30) Foreign Application Priority Data

Feb. 26, 1999 (JP) .................................................. 11-051557

(51) Int. Cl.[7] ............................ G02B 15/02; G02B 13/10
(52) U.S. Cl. .......................................... 359/704; 359/699
(58) Field of Search ................................. 359/823, 695, 359/696, 698, 699, 700, 701, 703, 704

(56) References Cited

U.S. PATENT DOCUMENTS

| 5,373,397 | * | 12/1994 | Satoh et al. | 359/699 |
| 5,583,595 | * | 12/1996 | Hara et al. | 396/79 |
| 5,933,285 | * | 8/1999 | Sato et al. | 359/694 |
| 6,198,578 | * | 3/2001 | Iwasa et al. | 359/699 |
| 6,204,977 | * | 3/2001 | Iwasa | 359/700 |

FOREIGN PATENT DOCUMENTS 10-10396  1/1998  (JP) .

\* cited by examiner

*Primary Examiner*—Georgia Epps
*Assistant Examiner*—Saeed Seyrafi
(74) *Attorney, Agent, or Firm*—Ostrolenk, Faber, Gerb & Soffen, LLP

(57) ABSTRACT

A lens housing including an anti-flare aperture device in the form of a thin planar aperture member. In one embodiment, a plurality of guide pins extend from a group-3 lens element, with a compression spring on one of the guide pins to bias the group-3 lens in the direction of its optical axis. The aperture member, the position of which is defined by two guide pins, is sandwiched between the group-3 lens and the compression spring, thereby being supported. The aperture member moves backward and forward together with the group-3 lens supported by the guide pins. In a second embodiment, the aperture device is attached directly to one side of the lens elements.

21 Claims, 10 Drawing Sheets

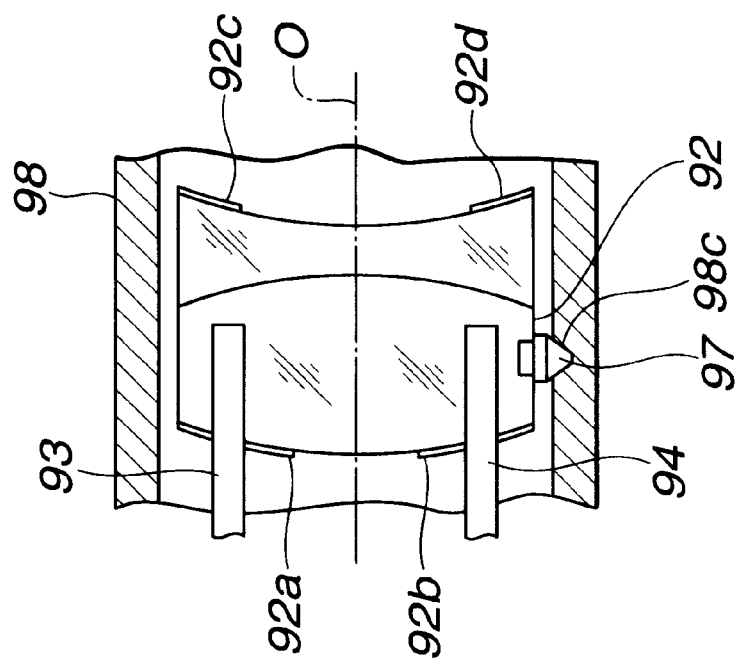
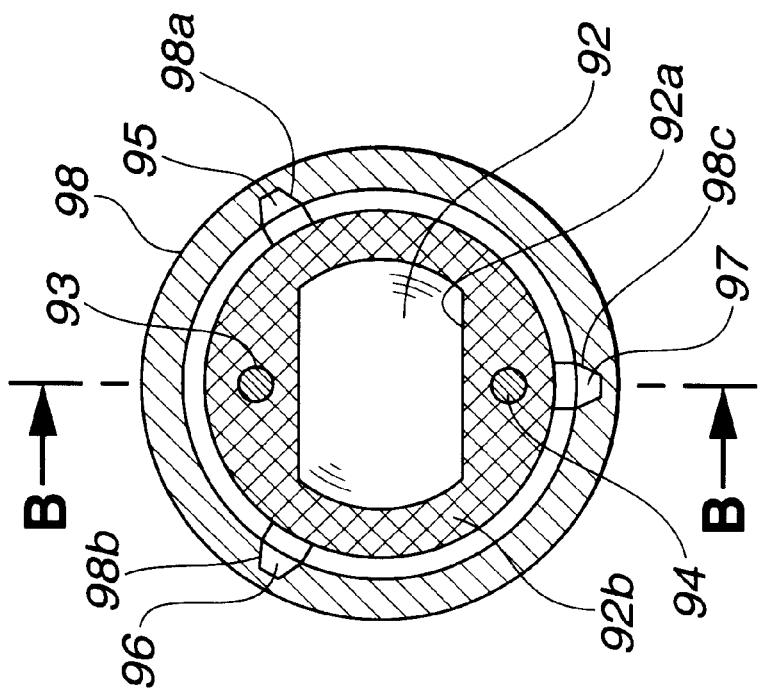
FIG. 10(A)
FIG. 10(B)

LENS HOUSING HAVING APERTURE DEVICE

BACKGROUND OF THE INVENTION

1. Field of the Invention

The present invention relates to a lens housing having an aperture device; particularly, the invention relates to a structure thereof.

2. Description of the Related Art

Conventionally, a lens housing having a flare-cutting aperture member for an optical apparatus, such as a camera, has been proposed according to Japanese Unexamined Patent Publication No. 10-010396. In the lens housing, the aperture member is provided in front of a predetermined lens so as to move backward and forward. When a lens other than the predetermined lens is move toward the predetermined lens by the amount exceeding a predetermined amount, the aperture member is driven toward the predetermined lens.

In the described lens housing, however, since the aperture member is supported so as to move backward and forward, there must be provided a supporting rod and a lens frame that are dedicated for slidably supporting the aperture member. This complicates the configuration, thereby providing unavoidable disadvantages such as that costs and the occupied space are forced to increase.

SUMMARY OF THE INVENTION

In order to solve the problems described above, an object of the present invention is to provide a lens housing having an aperture device that allows reduction in the number of configuration components and in the occupied space, thereby providing advantages in cost reduction and miniaturization.

To these end, according to one aspect of the present invention, there is provided a lens housing including an aperture device, having axial guide members for driving an optical member straight, and an aperture member supported by the axial guide members. In this configuration, the optical member is driven axially according to the axial guide members.

According to another aspect of the present invention, there is provided a lens housing including an aperture device, an optical element, axial guide members [provided directly in] attached to the optical element for guiding the optical element [straight] axially, and an aperture member supported by the axial guide members. In this configuration, the optical element is driven axially according to the axial guide members.

BRIEF DESCRIPTION OF THE DRAWINGS

FIG. 10A is a cross-sectional view along line A—A of FIG. 9; and

FIG. 10B is a cross-sectional view along line B—B of FIG. 9.

DESCRIPTION OF EMBODIMENTS OF THE INVENTION

Figure 1:
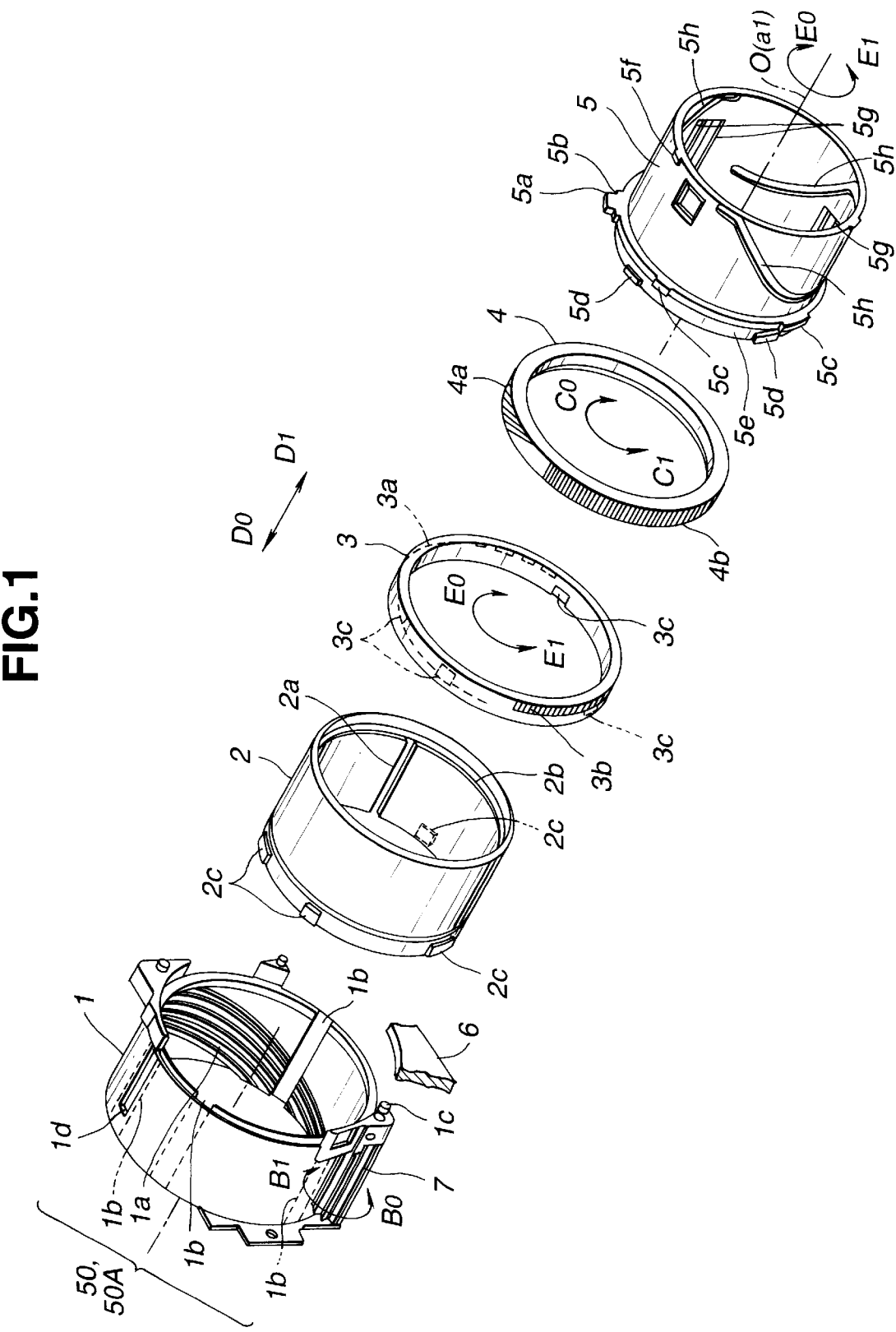
FIG. 1 is an exploded perspective view of a collapsible-barrel drive system constituting a lens housing having an aperture device of a first embodiment according to the present invention.
Figure 2:
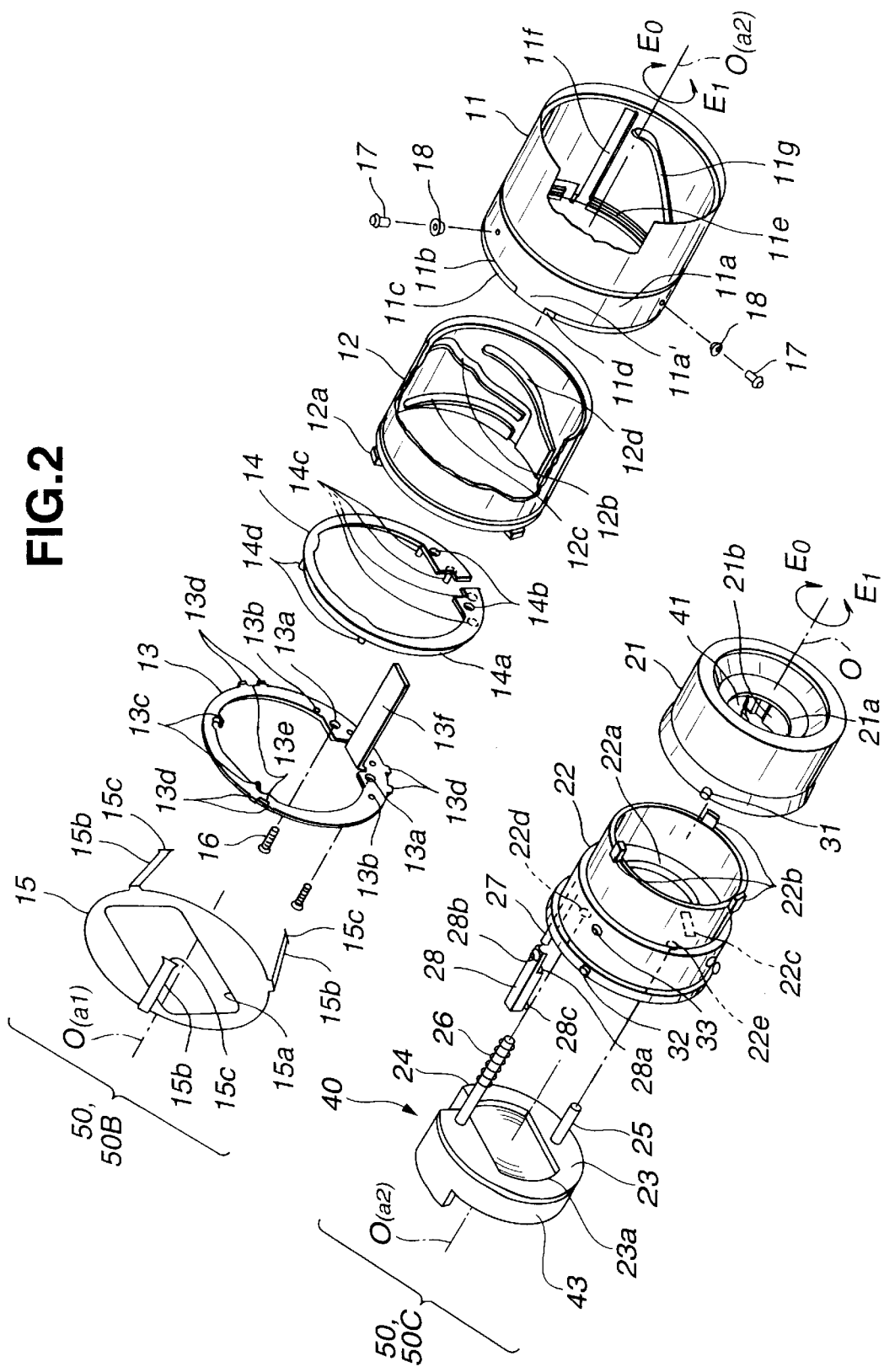
FIG. 2 is an exploded perspective view showing lens-group drive systems and a lens-group frame/lens-group section that constitutes the lens housing of the first embodiment.
Figure 3:
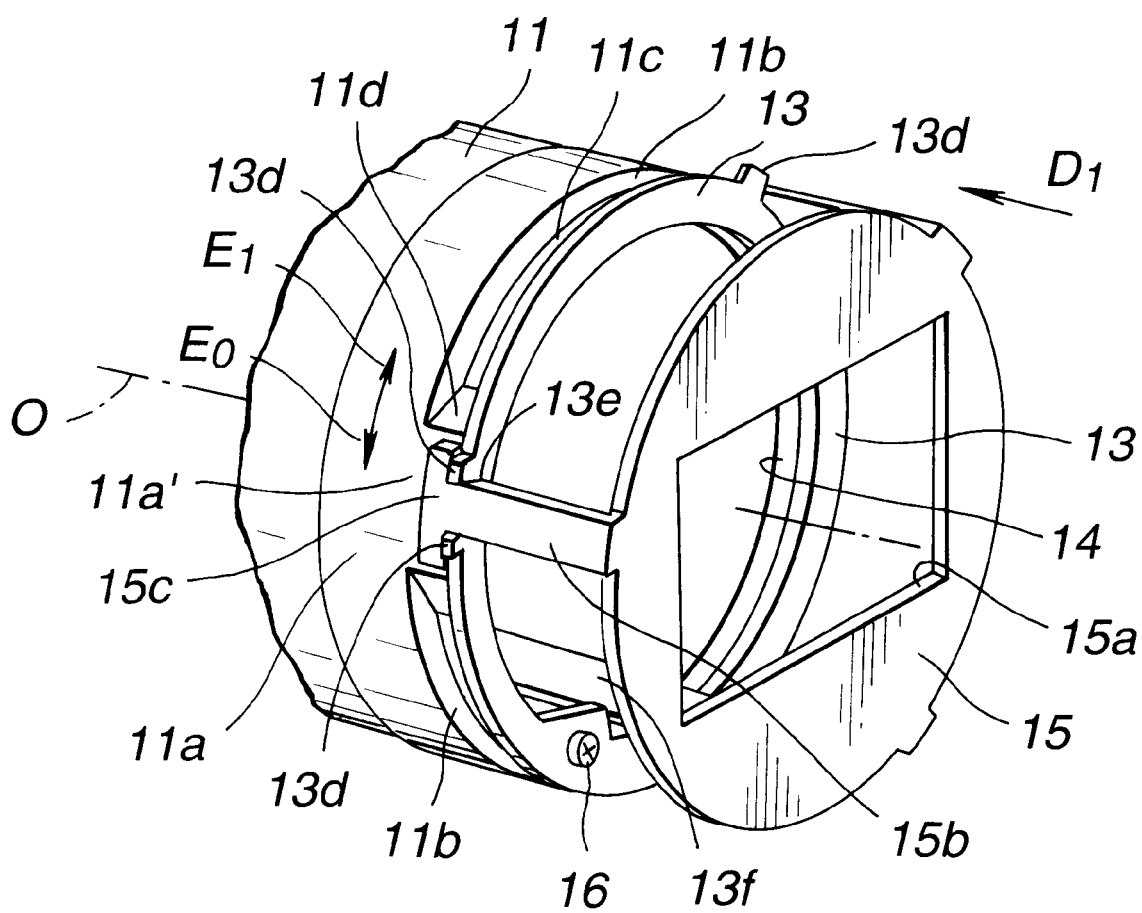
FIG. 3 is a perspective view of a portion in which a movable flare aperture of the lens housing according to the first embodiment is installed.
Figure 4:
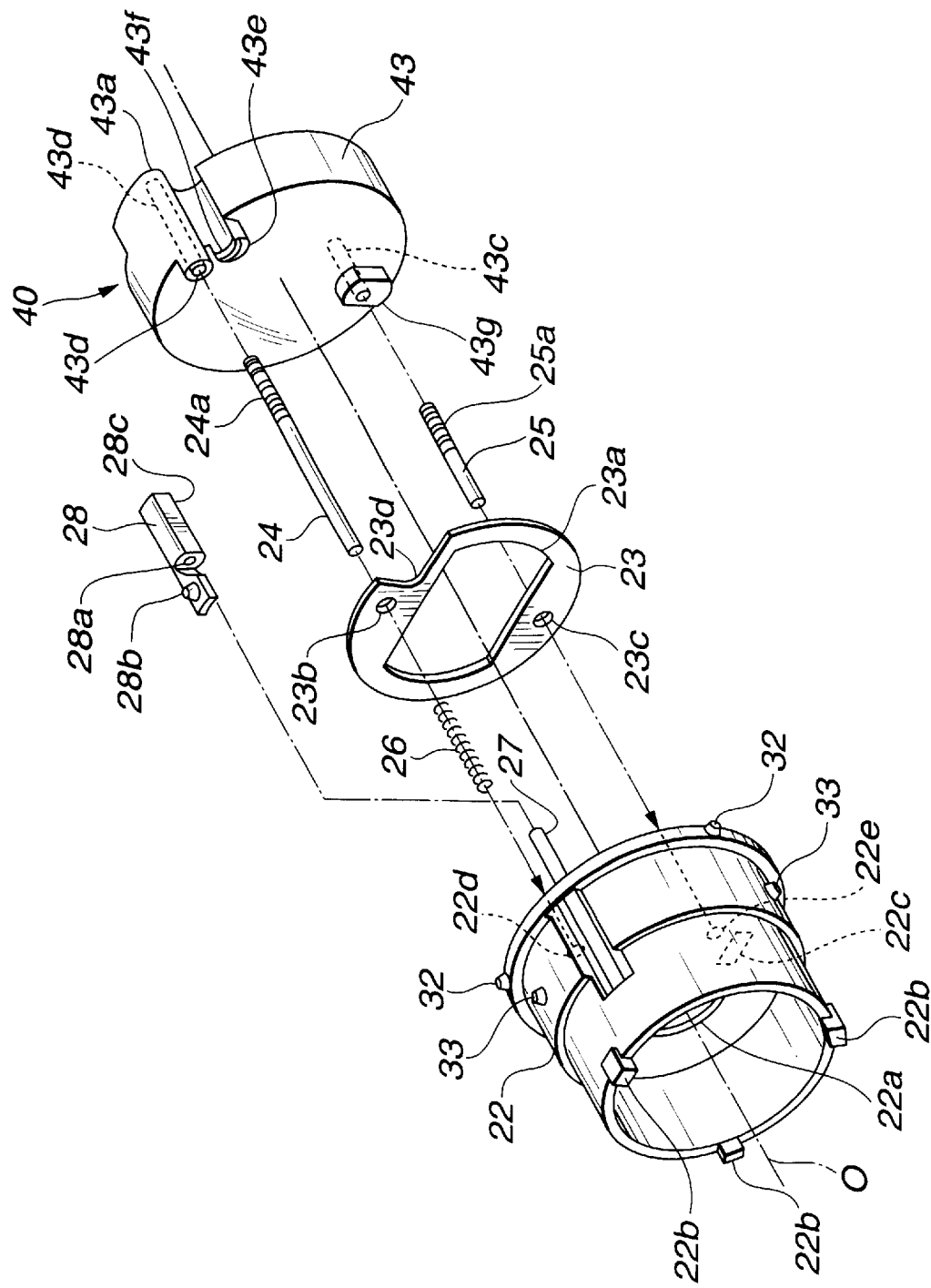
FIG. 4 is an exploded perspective view of portions such as group-2 frames and group-3 frame lens assembly of the lens housing according to the first embodiment.
Figure 5:
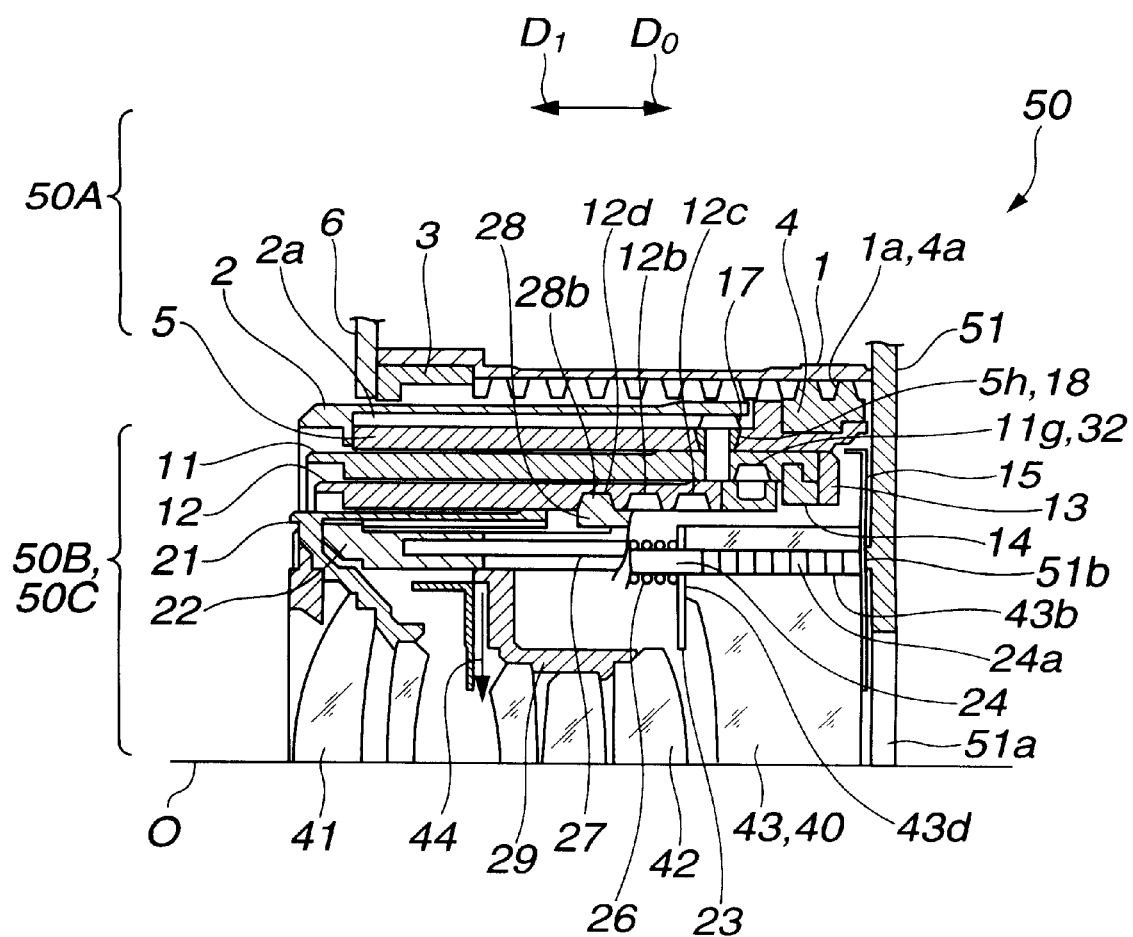
FIG. 5 is a vertical cross-sectional view showing a collapsed-barrel state of the lens housing according to the first embodiment.
Figure 6:
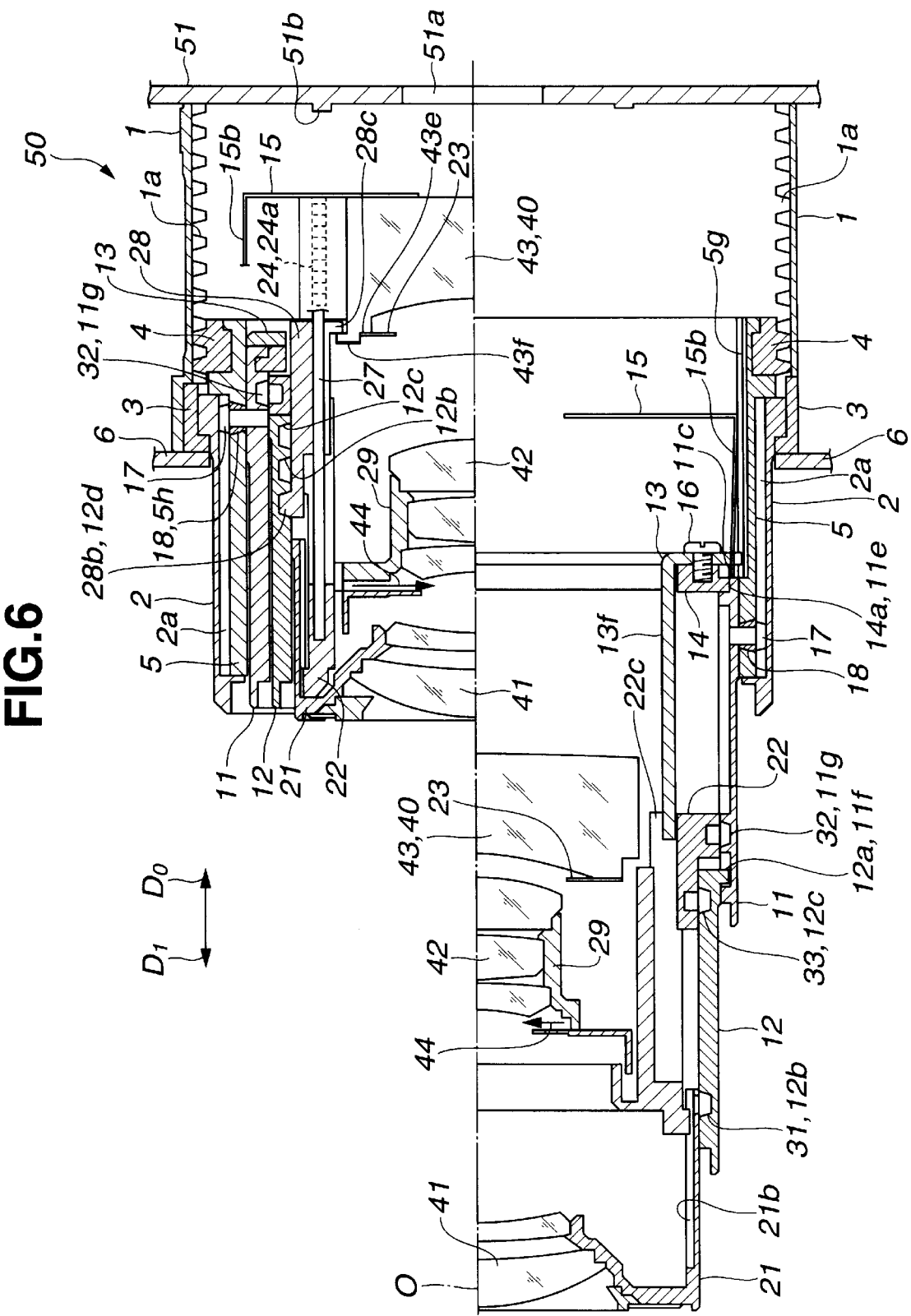
FIG. 6 is a vertical cross-sectional view of the lens housing of the first embodiment, in which the upper half shows an image-capturing preparation state and a wide-angle state, and the lower half shows a telescopic state.
Figure 7:
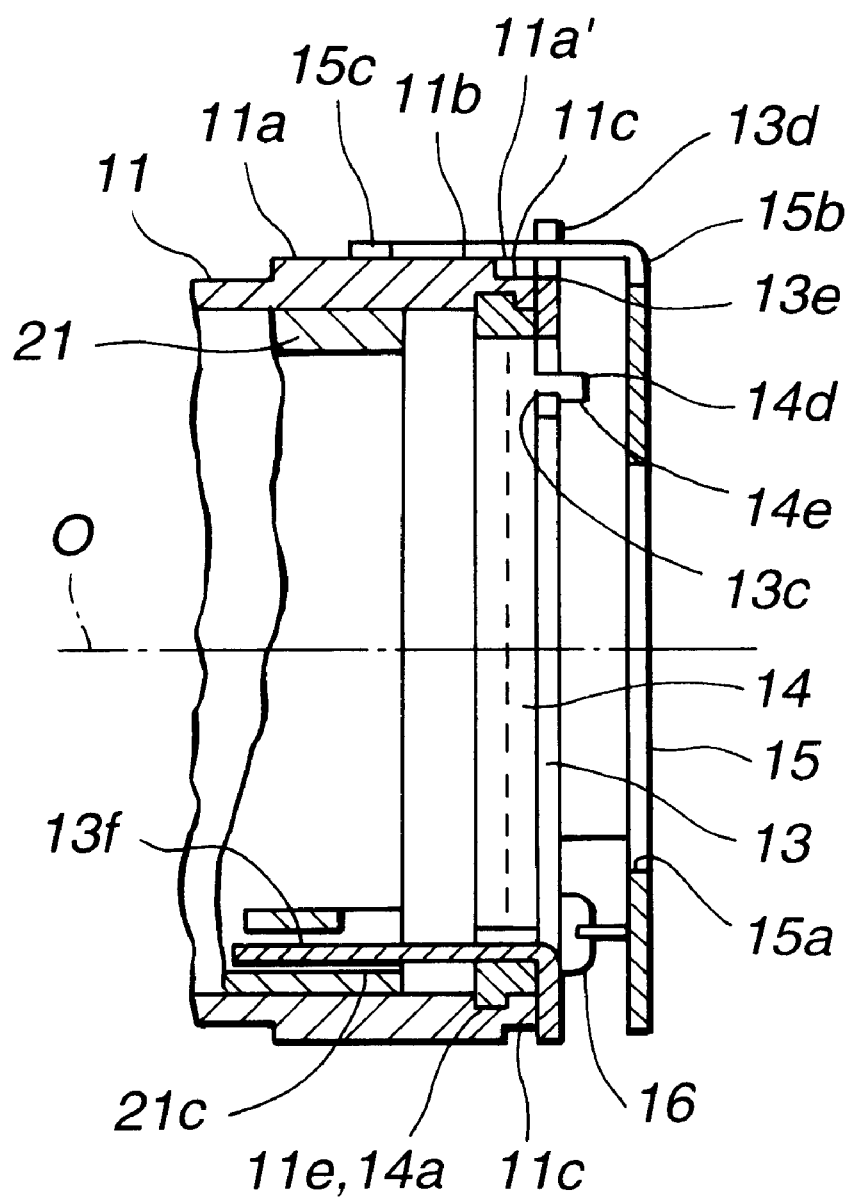
FIG. 7 is a vertical cross-sectional view of a portion in which the movable flare aperture of the lens housing according to the first embodiment is installed.
Figure 8:
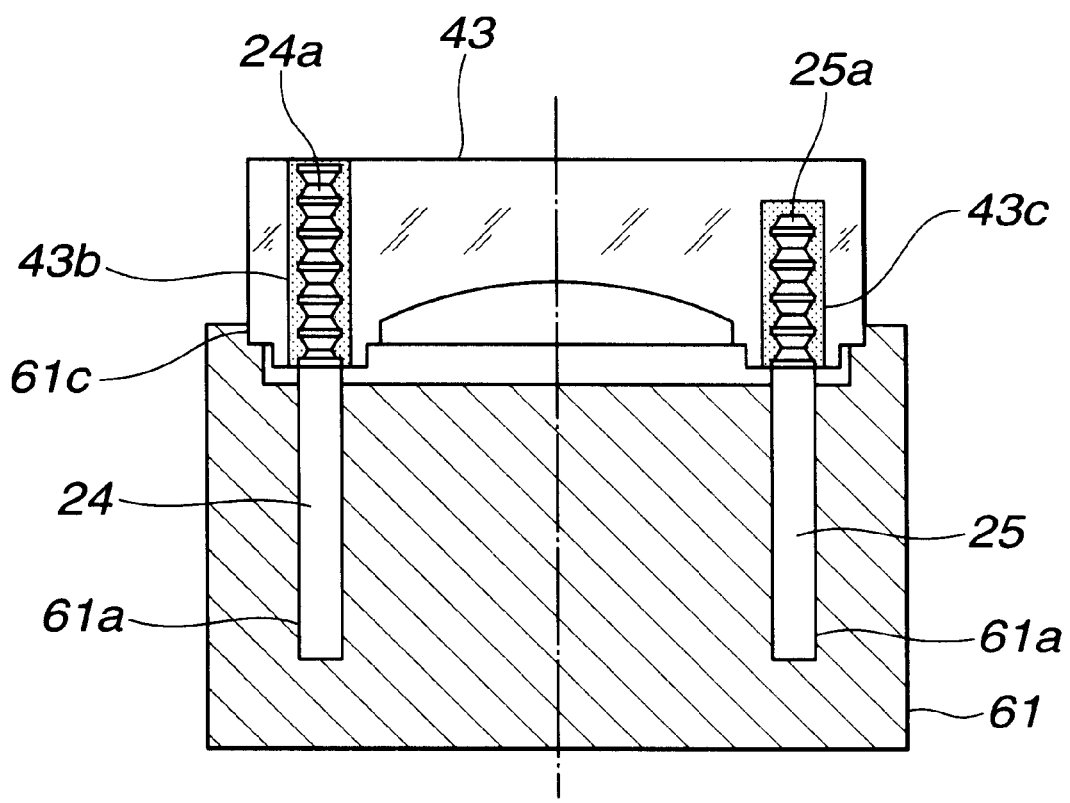
FIG. 8 is a vertical cross-sectional view of a state where positions of a lens assembly according to the first embodiment and a positioning jig are determined.

FIGS. 1 and 2 are exploded perspective views of a first embodiment of a lens housing 50 including an aperture device according to the present invention. FIG. 3 is a perspective view of a portion where a movable flare aperture 15 is fitted. FIG. 4 is an exploded perspective view of a group-2 frame, an aperture member, and a group-3 frame lens assembly and others. FIGS. 5 and 6 are vertical cross-sectional views of the lens housing 50 in different states; particularly, FIG. 5 is a view of a collapsed-barrel state, and FIG. 6 shows an image-capturing preparation state or a wide-angle state in the upper half portion, and a telescopic state in the lower half. FIG. 7 is a vertical cross-sectional view of a portion where the movable flare aperture 15 is fitted. FIG. 8 is a vertical cross-section view of guide-axis supported state of the group-3 frame lens assembly using a positioner. Referring back to FIGS. 1 and 2, the individual components are not shown in a direction of rotation at the time of assembly in order to make the shape to be apparent.

Lens housing 50 which may be used in cameras and other optical devices, is comprised of a collapsible-barrel drive system 50A, a lens-group drive system 50B, and a lens-group frame/lens-group section 50C. The collapsible-barrel drive system 50A in FIG. 1 performs an extending/retracting operation between a collapsed position and an image-capturing preparation position. The lens-group drive system 50B performs an extending operation of individual lens-group frames shown in FIG. 2.

As shown in FIG. 1, the collapsible-barrel drive system 50A has a immobilized frame 1, a rotation frame 2, a helicoid ring 4, and a moving frame 5, and other components. The immobilized frame 1 is immobilized and supported mainly by a camera body 51 (shown in FIG. 5) and has a helocoid-ring drive gear 7 and a drive ring 3, which is a drive member. The rotation frame 2, a lens frame, extends and retracts between a collapsed-barrel position and an image-capturing preparation position. The rotation frame 2 also rotationally moves between a wide-angle position and a telescopic position at the image-capturing preparation position. The helicoid ring 4 is rotatably and movably supported by the moving frame 5 described below. The moving frame 5 is a lens frame that moves axially together with the rotation frame 2 between the collapsed-barrel position and an image-capturable position.

The aforementioned members of the collapsible-barrel drive system 50A are described below in more detail. The immobilized frame 1, immobilized and supported by a camera body 51 (refer to FIG. 5), has a groove 1d for receiving a projection 5A of the moving frame 5 as described below. The immobilized frame 1 has also a female helicoid thread 1a and axial guide grooves 1b in an interior peripheral section. Also, the drive ring is fitted in a drive-ring supporting section 1c so as to be rotationally moved and driven, and a thrust-directional position of the drive ring 3 is defined by a stopper plate 6. The helicoid-ring drive gear 7 is axially elongated an axial direction and is rotatably supported by an exterior peripheral section. A toothed section of the helicoid-ring drive gear 7 is exposed to the interior peripheral section of the immobilized frame 1 through a slot (not shown).

The axial guide grooves 1b and other axial guide grooves described below run parallel to an optical axis O of an image-capturing optical system.

The drive ring 3 mentioned above has a zoom gear 3a and a viewfinder gear 3b in an exterior peripheral section, and has groove-like indented sections 3c in an interior peripheral section. The zoom gear 3a engages with a zoom drive system (not shown) so as to be driven thereby. The viewfinder gear 3b engages with a viewfinder drive system (not shown) so as to be driven thereby.

The aforementioned rotation frame 2 has an axial guide groove 2a in an interior peripheral section, an interior peripheral groove 2b in a front-end section of an interior peripheral section (on the side of a subject), and projections 2c on an exterior peripheral section. Also, the aforementioned helicoid ring 4 has a male helicoid thread 4a and a drive gear 4b on an exterior peripheral section.

The aforementioned moving frame 5 has an electronic-flash drive projection 5a, radial projections 5b, 5c, and 5d, and a peripheral guide 5e formed between the projections and a ring-like rib 5, connecting the projections 5c and the projection 5b on an exterior peripheral section. The moving frame 5 has also a projection 5f at the end, and three lines of axial guide grooves 5g in an interior peripheral section. Also, the moving frame 5 has cam grooves 5h, each running diagonally to the optical axis O and extending through the body of frame 5 from the interior to the exterior peripheral surfaces.

In the collapsible-barrel drive system 50A configured of the aforementioned members, the helicoid ring 4 is fitted into the moving frame 5 via the peripheral guide 5e and is rotatably supported in a state where the position in the axial-direction is controlled. Also, the lens-group drive system 50B and the lens-group frame/lens-group section 50C, which will be described below, are assembled in the interior peripheral section of the moving frame 5 so as to be rotatable, expendable, and retractable, and moving frame 5 is fitted into the interior peripheral section of the rotation frame 2. In this state, since the projection 5f engages with the interior peripheral groove 2b, the moving frame 5 is rotatable within frame 2 but is fixed in the axial-direction relative to rotation frame 2.

Also, with rotation frame 2 and moving frame 5 nested in frame 1, projections 2c, 5c, and 5b are fitted into the axial guide grooves 1b and 1d, and therefore rotation frame 2 and moving frame 5 are constrained against rotation within immobilized frame 1, to move axially. Further, when assembled male helicoid thread 4a of the helicoid ring 4 is engaged with the female helicoid thread 1a of the immobilized frame 1; and the drive gear 4b is engaged with the helicoid-ring drive gear 7.

In a state where the aforementioned rotation frame 2 and moving frame 5 are fitted into the immobilized frame 1 and are in the collapsed-barrel position on the side of a film surface (refer to FIG. 5), when the helicoid-ring drive gear 7 is rotated clockwise (as viewed from the side of a subject) in-direction B1, the helicoid ring 4 rotationally moves counterclockwise in direction C1. This rotational movement causes the moving frame 5 and the rotation frame 2 to integrally extend in direction D1 (in the direction of the subject) up to the image-capturing preparation position shown in to the upper half of FIG. 6.

In the state where the moving frame 5 and the rotation frame 2 have reached the image-capturing preparation position, the rotation frame 2 disengages from the axial guide grooves 1b of the immobilized frame 1, and is fitted into the side of the indented sections 3c of the drive ring 3. In this state, when the drive ring 3 is rotationally moved in direction E0 by the zoom drive system, the rotation frame 2 rotationally is moved slightly in the same direction from the image-capturing preparation position. Then, the rotation frame 2 reaches the wide-angle position, which is an image-capturing position. When the rotation frame 2 further rotationally moves in the same direction described above, it is zoom-driven to the telescopic position. When the drive ring 3 is rotationally moved in the reverse direction, that is, in direction E1, the rotation frame 2 rotationally moves from the zoomed position to the image-capturing preparation position. When the helicoid-ring drive gear 7 is further rotationally moved in the reverse direction to the above, that is, in direction B0, the rotation frame 2 and the moving frame 5 can be retracted to the collapsed-barrel position.

The lens-group drive system 50B is best illustrated in FIGS. 2, 3, 4, and 7. It is comprised of an M-cam frame 11, an F-cam frame 12, a key ring 13, a movable flare aperture member 15, and other components. The M-cam frame 11 is inserted into the moving frame 5 and is driven forward or backward and rotates together with the rotation frame 2. The F-cam frame 12, a cam device, rotates together with the M-cam frame 11 and extends and retracts via a group-2 frame 22. The key ring 13 is fitted with a key stopper 14 to guide lens-group frame 50B axially. The movable flare aperture member 15, is supported by the M-cam frame 11 and also moves axially.

The M-cam frame 11 is fitted into an interior peripheral section of the moving frame 5 so as to be rotationally movable and also to be extendable and retractable. M-cam frame 11 has an exterior peripheral surface 11a, three cam followers 17, three cam followers 18, a stepped side face 11b, a stepped peripheral face 11c, an end exterior peripheral surface 11a', and a peripherally sloped face 11d.

In the above configuration, the exterior peripheral surface 11a is a second slide face on which end projections 15c of the movable flare aperture 15 slide. Each of the cam followers 17 has an axis section to be press-fitted, and each of the cam followers 18 rotatably receives the axis of each of the cam followers 17. The end exterior peripheral surface 11a' is given a predetermined width. The peripherally sloped face 11d is provided adjacent to a stepped peripheral face 11c in the peripheral direction.

M-cam frame 11 further includes an interior peripheral groove section on the side of the film surface, three axial guide grooves 11f, and three group-2 cam grooves 11g each running diagonally relative to the optical axis 0.

The stepped peripheral face 11c described above is formed in an end section on the film surface side with one step indented down from the exterior peripheral surface 11a.

The stepped peripheral face 11c is a first slide face on which the end projection 15c of the arm section 15b of the movable flare aperture 15 slides. The width of the stepped peripheral face 11c in the axial direction is slightly larger than the width of the end projection 15c in the axial direction, thereby allowing the end projection 15c to slide in the peripheral direction.

The exterior peripheral surface 11a' has the same diameter as that of the exterior peripheral surface 11a provided in a peripheral direction of the abovementioned of the stepped peripheral face 11c. The end exterior peripheral surface 11a' serves, as described above, as the second slide face, thereby allowing the end projection 15c of the movable flare aperture 15 to slidably contact.

The peripherally sloped face 11d [is sloped in the peripheral direction], continuously engages the stepped peripheral face 11c and the exterior peripheral surface 11a', as shown in FIG. 3. The stepped side face 11b extends radially between the exterior peripheral surface 11a and the stepped peripheral face 11c (refer to FIG. 3).

The F-cam 12 fitted into an interior peripheral section of the aforementioned M-cam frame 11 so as to be extendable and retractable. The F-cam frame 12 has three projections 12a on its exterior surface. Also, on its interior surface, F-cam frame 12 has three group-1 cam grooves 12b, three group-2 cam grooves 12c, and one group-3 cam groove 12d, all of which extend diagonally relative to the optical axis O.

The movable flare aperture 15 is a very thin planer members having an opening 15a, which is a flare-aperture opening, formed in a central portion, and three arm sections 15b. Each of the three arm sections 15b is an elastically deformable, and protrudes and inclines slightly from a direction parallel to the optical axis O in a pre-installed original state. Also, the arm sections 15b have circumferentially extended projections 15c. In the assembled state, the end projections 15c elastically deform and are urged by a predetermined force so as to contact the exterior peripheral surface 11a or the stepped peripheral face 11c of the M-cam frame 11.

The aforementioned key ring 13 is a planar member for axially guiding the individual lens-group frames. It has screw holes 13a, position-defining holes 13b, three double-lined projections 13d, grooves 13e between the individual double-lined projections 13d, two cutouts 13c, and a straight-guiding key 13f extending in the direction of optical access O.

The circumferential length of the groove 13e is greater than the width of each of the arm sections 13c to allow insertion of the three arm sections 15b of the movable flare aperture 15. Also, the diameter of the bottom face of the groove 13e is arranged to be the same as or smaller than the diameter of the stepped peripheral face 11c of the M-cam 11 (refer to FIGS. 3 and 7).

The key stopper 14 is an elastically deformable member, in which a circular part 14f is cut out. The key stopper 14 has a dollar 14a provided along the periphery, two screw holes 14b, position-defining pins 14c at both sides of each of the screw holes 14b, and two stopper pins 14d. The position-defining pins 14c can be received by the corresponding position-defining holes 13b. Each of the stopper pins 14d is notched to define a radially extending tab 14c which engages with cut outs 13c (see FIG. 7).

In assembly, the F-cam frame 12 is first fitted in the M-cam frame 11 so as to slide forward and backward. The insertion is performed in a state where the projections 12a are engaged with the axial guide grooves 11f in the interior peripheral section thereof. Further, the individual lens-group frames described below are assembled into interior peripheral sections of the M-cam frame 11 and the F-cam frame 12 so as to be extendable and retractable.

The M-cam frame 11, in which the lens-group frames and other relevant components are installed, is then inserted into the interior peripheral section of the moving frame 5 of the collapsible-barrel drive system 50A so as to be rotatable and movable. Then, the cam followers 18 of the M-cam frame 11 are engaged with cam grooves 5h so as to be slidable. Also, the cam followers 17, which are axes of the cam followers 18, are inserted into the moving frame 5 and engaged with the axial grooves 2a of the rotation frame 2 so as to be slidable. In this case, according to the rotational movement of the rotation frame 2, the M-cam frame 11 is integrally rotated and moved, and is then driven forward and backward, that is, in the optical-axis direction, by means of the cam grooves 5h of the moving frame 5.

In a state where the key stopper 14 is expanded in the radial direction, the collar 14a is inserted into the interior peripheral groove 11e of the M-cam frame 11. To this key stopper 14, the key ring 13 is fitted in a state where the position is defined by means of the position-defining pins 14c and the position-defining holes 13b, and is then fixed with screws 16. Thus, the key ring 13 is supported so as to be rotatable and movable in a state where the position in the axial-direction is controlled to the film-side end section in relation to the M-cam frame 11.

In the above state where the key ring 13 is fitted, as shown in FIG. 7, the stopper pins 14d of the key stopper 14 are engaged with the cutouts 13c of the key ring 13. In this case, the engaging tab 14e of the stopper pins 14d is also engaged therewith, thereby, the key stopper 14 and the key ring 13 are held without an open space.

The double-lined projections 13d are engaged with double lines of the axial grooves 5g of the moving frame 5 so as to be slidable. Thereby, the key ring 13 Snot permitted to rotatably move, but is driven to move axially. In addition, since the axial guide key 13f of the key ring 13 is engaged with a axial guide hole 22c of a group-2 lens frame 22 (which will be described below) so as to be slidable, the group-2 lens frame 22, a group-1 lens frame 21 supported by the group-2 lens frame 22, and a group-3 lens 43 are all guided for axial movement.

As shown in FIG. 3, movable flare aperture 15 is installed with arm sections 15b extending through the grooves 13e of the key ring 13 from the film surface side, the end projections 15c are fitted onto the exterior peripheral surface 11a of the M-cam frame 11 or the circumferential of groove surface 11c of the M-cam frame 11 so as to be slidable thereon.

As shown in FIGS. 2, 4, 5, and 6, the lens-group frame/lens-group section 50C has the group-1 lens frame 21, the group-2 lens frame 22, a movable follower 28, a group-3 lens assembly 40, an aperture member 23, a compression spring 26, a focussing frame 29 (refer to FIGS. 5 and 6), and other relevant components. The group-1 lens frame 21 is incorporated in the M-cam frame 11 and F-cam frame 12, is composed of the individual axially movable lens-group supporting frames [moving straight] and lens groups, and is driven so as to be extendable and retractable via the F-cam frame 12, and supports a group-1 lens 41.

The group-2 frame 22 is guided to move axially via the key ring 13. The movable follower 28 is a cam follower member driven so as to be extendable and retractable via the F-cam frame 12. The group-3 lens assembly 40 includes axial guide pins 24 and 25 individually immobilized on the group-3 lens 43. An aperture member 23 is provided on the subject of the group-3 lens 43 to control incident light. A compression ring 26 urges the group-3 lens 43 and the aperture member 23 in the direction of the film surface side.

The focussing frame 29 is supported by the group-2 frame 22 (refer to FIGS. 5 and 6), and is driven axially by means of a focussing-drive system (not shown).

The group-2 lens frame 22 has three cam followers 32 has three cam followers 33 projecting from its exterior peripheral surface, and three protrusions 22b at the end away from the film place (see FIG. 2) on its interior surface, group-2 lens frame 22 has a guiding hole 22c, axial holes 22d, a cutout 22e , guide pin 27, and an opening 22a (refer to FIG. 4). Guide hole 22c receives the [straight-guiding] axial guide key 13f of the key ring 13. The axial hole 22d [is provided in the direction of the optical axis O, in which] receives guide pin 24 guide pin 25 is inserted in cut out 22e. Guide pin 27 is immobilized and supported in the direction of the optical axis O. The opening 22a is used for installation of a shutter 44.

The group-1 lens frame 21 has an opening 21a supporting the group-1 lens 41, three cam followers 31 extended from its exterior surface, and axial guide grooves 21b in its interior surface.

The movable follower 28 (see FIG. 4) regulates the extension and retraction of the group-3 lens 43. It has an axial bore 28a, a cam follower 28b, and an engaging tab 28c. Axial bore 28a receives guide pin 27 of the group-2 lens frame 22 so as to be slidable. Tab 28c engages with the cam follower 28b and the group-3 lens 43, thereby regulating the axial position of the group-3 lens 43.

Lens 43, a constituent member of the group-3 lens assembly 40, is advantageously formed of an optical-grade plastic. Lens 43 has axis-installation openings 43b and 43c and an engagement section 43f corresponding to the engaging tab 28c that extends and retracts cam follower 28b.

When assembled, respective axis-installation openings 43b and 43c receive guide pins 24 and 25 as described below, in a state where they are freely engaged with each other. Thus, the position of the assembly is determined and is immobilized to the group-3 lens 43 without a frame member being used therebetween and group-3 lens 43 is extendable and retractable in relation to the group-2 frame 22 via the guide pins 24 and 25.

The end sections 24a and 25a of guide pins 24 and 25 which are inserted in installation openings 43b and 43c include multiple tapered surfaces superposed along the axial direction for preventing reflection of light from the lens sections (see FIG. 8).

To immobilize the guide pins 24 and 25 to the group-3 lens 43, as shown in FIG. 8, they are first inserted into, precision insertion openings 61a and 61b in a positioning jig 61. In each of these openings, the insertion clearance is very small, for example, several microns. Subsequently, the subject-side outside-diametrical section of group-3 lens 43 is fitted to a lens-positioning fitting section 61c in the positioning jig 61 that determines an outside-diametrical position and an end-surface position in the light-axis-direction of the group-3 lens 43.

In the above-installation condition, respective end sections 24a and 25a of guide pins 24 and 25 are loosely fitted into installation openings 43b and 43c in a boss section 43a of the group-3 lens 43. In this support condition each of the guide pins 24 and 25 is radially supported with a high degree of precision. While this support condition the clearance resulting from the loose fit between the guide pins 24 and 25 and the axis-installation openings 43b and 43c is filled with adhesive to immobilize to the group-3 lens 43 within the group-3 lens assembly 40.

The above-described aperture member 23 is a thin and planar member. It has an aperture opening 23a, axial guide holes 23b and 23c, and a cutout section 23d. Guide holes 23b and 23c allow the guide pins 24 and 25 to be inserted, respectively. The cutout section 23d is formed to engage with the member-contact surface at a recess portion for the engagement section 43f around the group-3 lens 43.

The focussing frame 29 (see FIGS. 5 and 6) supports the group-2 lens 42 and is supported by the group-2 lens frame 22 so as to be axially movable. The focussing frame 29 is driven axially by means of a focussing-drive system (not shown).

In the lens-group frame/lens-group section 50C described above, as shown in FIG. 2, the protrusions 22b on the exterior peripheral section on the subject side of the group-2 frame 22 are slidably engaged with the grooves 21b of the group-1 lens frame 21. Then, the group-1 lens frame 21 is fitted to the group-2 lens frame 22. Also, the group-3 lens 43 is fitted therewith in a state where the [guiding axis] guide pins 24 and 25 are slidably inserted into the axis hole 22d and the cutout 22e, respectively.

Compression spring 26 and aperture member 23 are inserted between the group-2 frame 22 and the group-3 lens 43. That is, as shown in FIG. 4, the guide pins 24 and 25 are inserted into the guide holes 23b and 23e, respectively, and in addition, the compression spring 26 is inserted at the side of guide pin 24 from the subject side of the aperture member 23. In this installation condition, the aperture member 23 is supported in a state where it is in contact with aperture-member contact surfaces 43d, 43e, and 43g on the subject side. Concurrently, the group-3 lens 43 is biased in the direction of the film surface.

Further, the guide pin 27 is slidably inserted into the axial bore 28a, and then, the movable follower 28 is fitted with the group-2 lens frame 22. In a state where an abutting force of the camera body 51 is not exerted on the group-3 lens 43, the engaging tab 28c of the movable follower 28 engages with the engaging section 2b of the group-3 lens 43, thereby, the position of the group-3 lens 43 is defined.

Thus, the lens-group frame/lens group section 50C is installed in the M-cam frame 11 and the F-cam frame 12 of the lens-group drive system 50B so that it moves axially forward and backward. Also, axial guide key 13f of the key ring 13 is slidably fitted through guide hole 22c of the group-2 lens frame 22. Accordingly, the group-1 lens frame 21, the group-3 lens 43, the aperture member 23, and the movable follower 28 are also supported integrally with the group-2 lens frame 22 so as to move axially forward and backward.

The cam followers 31 of the group-1 lens frame 21 are inserted into the corresponding group-1 cam grooves 12b of the F-cam frame 12. Also, the cam followers 32 and 33 of the group-2 lens frame 22 are inserted into the corresponding group-2 cam grooves 11g of the M-cam frame. In addition, the movable cam follower 28b is engaged with the group-3 cam groove 12d of the F-cam frame 12.

The position of the group-2 is defined by the group-2 lens frame 22 cam grooves 11g of the M-cam frame 11. The position of the F-cam frame 12 is defined by the group-2 lens frame 22 and the group-2 cam grooves 12c of the F-cam frame 12. The position of the movable follower 28 is defined by the group-3 cam groove 12d of the F-cam frame 12. Also, the position of the group-3 lens 43 is defined via the engaging tab 28c of the movable follower 28.

A description will now be given of retraction and extension operations of the lens housing 50 configured as described above.

With the lens housing 50 in the collapsed-barrel stated as shown in FIG. 5 all the members are within the immobilized frame 1, and group-3 lens 43 and the movable flare aperture 15 are driven by a protrusion 51b located near an aperture 51a of the camera body 51 to a stowed (collapsed-barrel) position. This position is relatively close to the group-2 frame 22 and the M-cam frame 11.

With group-3 lens 43 positioned close to the group-2 frame 22 the movable follower 28 is regulated and supported by the F-cam frame 12. In this case, the engaging tab 28c of the movable follower 28 and the engagement section 43f of the group-3 lens 43 are disengaged and spaced from each other.

In this state, as shown in FIG. 7, the end protrusion 15c of the movable flare aperture 15 slides on the exterior peripheral surface 11a of the M-cam frame 11 and moves forward.

To drive the lens housing 50 from the collapsed-barrel state to the image-capturing preparation state, the helicoid-ring drive gear 7 is rotated in direction B1, and the helicoid ring 4 is rotated in direction C1. According to the degree of rotation, frames 2 and 5, are guided by axial guide grooves 1b are integrally moved in direction D1. The configuration of lens housing 50 when extended from the collapsed-barrel position to the image-capturing preparation position is shown in the upper half of FIG. 6. In this state, the moving frame 5 remains engaged with guide grooves 1d and 1b but projections 2c disengage from guide grooves 1b and engage with the indented sections 3c of the drive ring 3. Accordingly, rotating frame 2 becomes rotationally movable.

When the zoom drive system moves drive ring 3 toward E0 by a slight angle from the aforementioned image-capturing preparation state, the lens housing 50 is thereby driven to be in the wide-angle state as shown in the upper half of FIG. 6.

During the shift from the collapsed-barrel state to the image-capturing preparation state and the wide-angle state, the group-2 lens frame 22, the rotating frame 2, and the moving frame 5 extend integrally. The group-3 lens 43 and the aperture member 23 are forced by compression spring 26 to move backward, i.e., away from the M-cam frame 11 and the group-2 lens frame 22. Then, the group-3 lens 43 and the aperture member 23 moves backward relative to a wide-angle-ready position where the engaging tab 28c of the movable follower 28 engages with the engagement section 43f of the group-3 lens 43.

During the aforementioned driving, the movable flare aperture 15 is pushed back by the group-3 lens 43 as it moves back relative to the M-cam frame 11. At this time, the end protrusions 15c of the three arm sections 15b arrive over the exterior peripheral surface 11a of the M-cam frame 11 shown in FIG. 3. Also, when the M-cam frame 11 rotationally moves slightly in the direction E0 up to the wide-angle position, the end protrusions 15c slide down the continuously sloped face lid 11d and arrive over the stepped peripheral face 11c. The movable flare aperture 15 in this state is located in a predetermined relative position with respect to the M-cam frame 11, whereby providing an intended normal function.

To drive the lens housing 50 from the wide-angle state to the telescopic state, the drive ring 3 is rotated in the direction E0, and the rotating frame 2 is rotated in the same direction (refer to the lower half of FIG. 6). According to the degree of rotational movement of drive ring 3, the M-cam frame 11 rotates and extends along the cam grooves 5h of the moving frame 5. At this time, the F-cam frame 12 is also rotated by the straight-guiding grooves 11f together with the M-cam frame 11. In this case, the extending position is defined via the cam followers 33 of the group-2 lens frame 22, which engage with the group-2 cam grooves 12c.

Guided axially by the key ring 13, the group-2 lens frame 22 is driven by the group-2 cam grooves 11g of the M-cam frame 11, which engage with the cam follower 32, to extend to a telescopic-ready position. Also, the group-1 lens frame 21 is driven to extend to the telescopic-ready position according to the group-1 cam grooves 12b of the F-cam frame 12, which engage with the cam followers 31. Similarly, the group-3 lens 43 is driven to the telescopic-ready position in a state where the position of the movable follower 28 is defined by the group-3 cam groove 12d, and the cam follower 28b of the movable follower 28 engages with the engagement section 43f of the group-3 lens 43. At this time, the aperture member 23 is also driven together with the group-3 lens 43.

While the M-cam frame 11 rotates to extend and retract between the wide-angle state and the telescopic state, the movable flare aperture 15 is supported [without being rotationally moved] against rotation by the grooves 13e of the key ring 13. At this time, the end protrusions 15c of the movable flare aperture 15 are sandwiched between the stepped side face 11b and side faces of the groove 13e, and slide over the stepped peripheral face 11c. In this way, the movable flare aperture 15 is securely supported at a predetermined spaced position in relation to the M-cam frame 11, whereby providing a normal intended function as the flare aperture.

Next, a description will be given of a case where the lens housing 50 is driven from the wide-angle state to the image-capturing preparation state and further to the collapsed-barrel position. In this case, the drive ring 3 is rotated in the direction E1, thereby driving the lens housing 50 to the image-capturing preparation state. In this state, the group-1 lens frame 21 and the group-2 lens frame 22 are extended into the moving frame 5. The group-3 lens 43 is still located in a position where it driven backward in relation to the M-cam frame 11 (refer to the upper half of FIG. 6) which, in turn causes end protrusions 15c on movable flare aperture arms 15b to be rotated in the direction E1. Therefore, the end protrusions 15c slide over the continuously sloped face 11d to the exterior peripheral surface 11a (refer to FIG. 3).

Subsequently, the helicoid-ring drive gear 7 is rotationally driven in the direction B0, thereby rotating the helicoid ring 4 in direction C0. According to the above, the moving frame 5 and the rotating frame 2 integrally move back in direction D0, and the projections 2c of the rotating frame 2 are disengaged from the drive ring 3. When the helicoid ring 4 is further rotated, the rotating frame 2 moves together with the moving frame 5 in the direction D0 and is retracted to the collapsed-barrel position so as to be housed in the immobilized frame 1 (refer to FIG. 5).

According to the above collapsed-barrel operation, the group-3 lens 43 and the movable flare aperture 15 are pushed by the protrusion 51b of the camera body 51 to relatively move forward against the biasing force of the compression spring 26. Then, as described above, the group-3 lens 43 is disengaged from the movable follower 28, and is moved into the stowed position as shown in FIG. 5. The movable flare aperture 15 also moves forward relative to the M-cam frame 11 in the direction of the optical axis O, and the end protrusions 15c, arm sections, slide forward on the exterior peripheral surface 11a from the exterior peripheral surface 11a of the M-cam frame 11 so as to be in the collapsed-barrel state.

In this embodiment, the guiding axis 27 for slidably supporting the movable follower 28 is provided on the side of the group-2 frame 22. However, it may be provided on the side of the group-3 lens 43.

The aperture member 23, which is the constituent member of the aperture assembly included in lens housing 50, is provided in front of the group-3 lens 43 in a state where it is fitted with the guide pins 24 and 25 for the group-3 lens 43, and is directly immobilized to the group-3 lens 43. Accordingly, the configuration does not require members to be used dedicatedly for installation of the aperture member 23, thereby reducing the number of required components. Furthermore, since the aperture member 23 is thin and planar, the space occupied is small.

Figure 9:
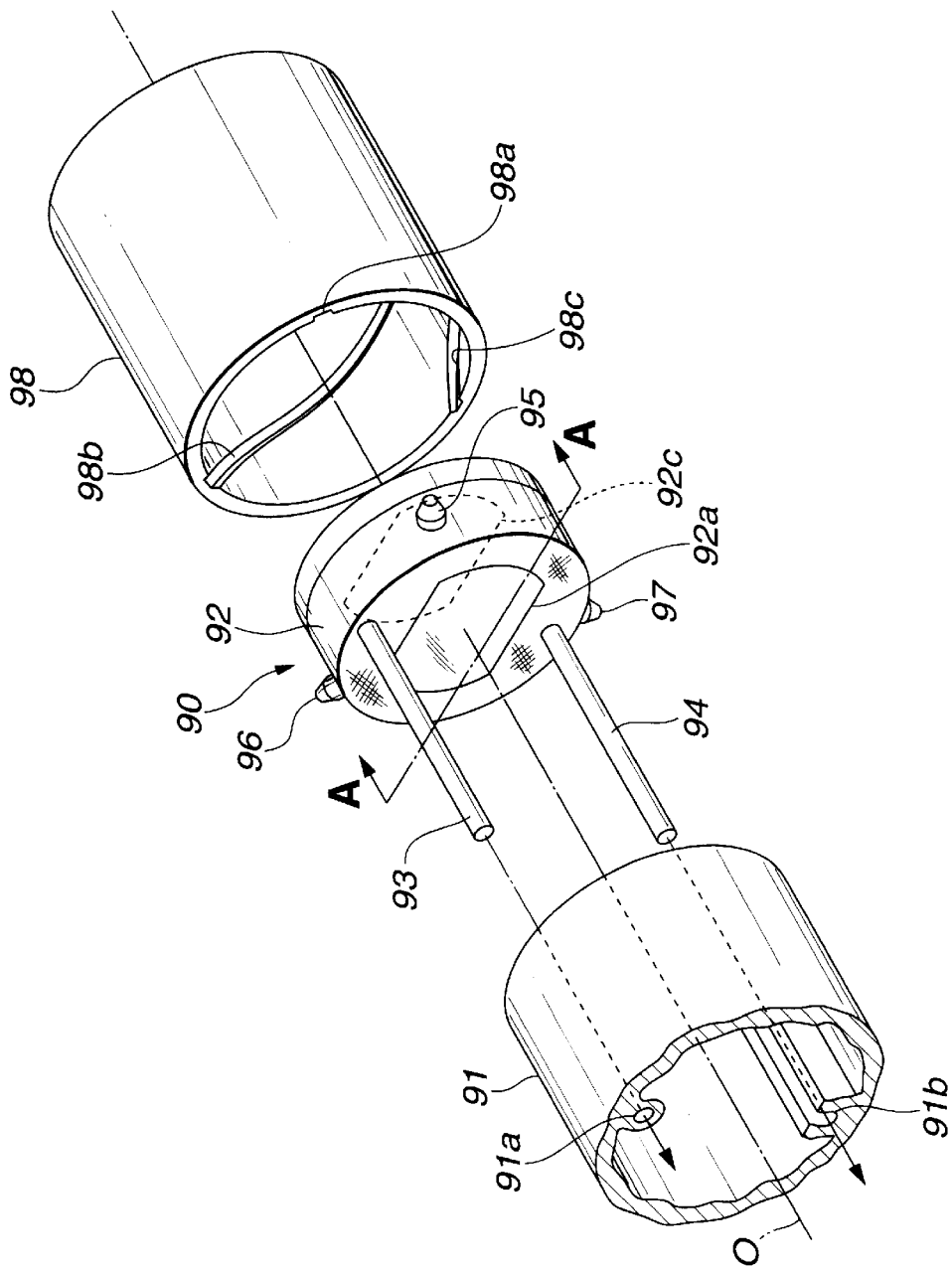
FIG. 9 is an exploded perspective view of a lens housing including an aperture device according to a second embodiment of the present invention.

A second embodiment of a lens housing including an aperture device according to the present invention is shown in FIG. 9 which is an exploded perspective view of main portions of the lens housing. FIG. 10A is a cross-sectional view along line A—A of FIG. 9. FIG. 10B is a cross-sectional view along line B—B of FIG. 10A.

In this embodiment, the main components are a lens assembly frame 91, and a cam cylinder 98. The moving frame 91 may be an immobilized frame, and includes an axial hole 91a, and an axially extending cutout 91b. A guide pin 93 described below is slidably inserted into hole 91a. A rotation-stopping guide pin 94 described below is slidably inserted into the cutout 91b.

The lens assembly 90 is configured of a lens 92, the guide pin 93, the rotation-stopping guide pin 94, and three cam followers 95, 96, and 97. The lens 92 is preferably formed of an optical-grade plastic.

As an aperture device for restricting incident light, the lens 92 has a shielding-coating applied surface 92b that forms a rectangular aperture opening 92a the light-incident side, i.e., the optical convex surface or concave surface. The lens 92 also has a shielding-coating applied to surface 92d that forms a rectangular aperture opening 92c on a light-emergent side (optical convex surface or concave surface). On these shielding-coating applied surfaces 92b and 92d, surface treatments are provided.

The guide pin 93 and the rotation-stopping guide pin 94 are inserted outside of areas in which light is permitted to pass through the lens 92. They are immobilized and supported perpendicular to optical axis O. The three cam followers 95, 96, and 97 are immobilized in three peripheral directions of the lens 92.

The cam cylinder 98 is supported so as to be rotatable and movable in relation to the moving frame 91. Three cam grooves 98a, 98b, and 98c are provided inside of the cam cylinder 98. The cam grooves 98a, 98b, and 98c slidably receive the cam followers 95, 96 and 97, respectively.

In the lens housing of this embodiment of the present invention, having the described configuration, when the cam cylinder 98 is rotated, the lens 92 slidably supported by the moving frame 91 via the guide axes 93 and 94 is driven by the cam grooves 98a, 98b, and 98c of the cam cylinder 98 so as to be extendable and retractable along the optical axis O. With the lens 92, ineffective light is rejected at the aperture openings 92a and 92b on the surfaces on the incident side and the emergent side, thereby permitting only effective light to pass through.

As described above, according to the lens assembly 90 included in the described lens housing of the second embodiment, the aperture openings 92a and 92c are directly formed by coating on the areas (optical surfaces) of the incident surface and the emergent surface of the lens 92 into which the guide axes 93 and 94 are immobilized. This configuration does not require an aperture member dedicated for aperture, thereby allowing miniaturization and cost reduction of the lens housing to be implemented.

According to the present invention, the aperture member is supported by the axial guide members whereby, the number of components required and the space occupied are reduced. This allows provision of the lens housing that is advantageous in implementation of the cost reduction and miniaturization.

The present invention has been described with reference to what are presently considered to be the preferred embodiments. It is to be understood, however, that the invention is not limited to the disclosed embodiments. On the contrary, the invention is intended to cover various modifications and equivalent arrangements included within the spirit and scope of the invention.

What is claimed is:

1. An optical assembly comprised of:
   an optical member having an optical axis;
   a guide structure which supports the optical member for movement along the optical axis; and
   an aperture member supported by the guide structure at a fixed distance from the optical member such that the aperture members remains at the fixed distance from the optical member during movement of the optical member along the optical axis.

2. An optical assembly as described in claim 1, further including:
   a frame assembly for guiding the optical member guide structure;
   a cam follower in the optical member; and
   a cam member including a cam groove for engaging with the cam follower,
   the cam follower and the cam groove cooperating to move the optical member along the optical axis.

3. An optical assembly as described in claim 1, wherein the aperture member is comprised of a flat plate portion extending perpendicular to the optical axis of the optical member.

4. An optical assembly as described in claim 1, wherein:
   the guide structure is comprised of at least one elongated guide member having its axis of elongation parallel to the optical axis of the optical member; and
   an aperture member includes:
      an aperture in a plane perpendicular to the optical axis of the optical member; and
      an opening for receiving the elongated guide member.

5. An optical assembly as described in claim 1, wherein:
   the guide structure is comprised of a plurality of elongated guide members, each having a first and a second end, with the respective first ends being attached directly to the optical member, and having their respective axes of elongation extending parallel to the optical axis of the optical member.

6. An optical assembly as described in claim 5, wherein the aperture member includes:
   an aperture in a plane perpendicular to the optical axis of the optical member; and a plurality of openings for receiving the second ends of the respective elongated guide members.

7. An optical assembly as described in claim 1, wherein the aperture member is secured directly to a surface of the optical member.

8. An optical assembly as described in claim 1, wherein the aperture member is supported by the guide structure on a subject-side of the optical assembly.

9. A lens housing for an optical element comprised of:
   a guide structure which supports an optical member mounted in the housing for movement along an optical axis of the housing; and
   an aperture member supported by the guide structure at a fixed distance from the optical member such that the aperture member remains at the fixed distance from the optical member during movement of the optical member along the optical axis of the housing.

10. A lens housing as described in claim 9, further including:
    a frame assembly for guiding the optical member guide structure;
    a cam member including a cam groove, and a cam follower,
    the cam follower and the cam groove cooperating to move the optical member along the optical axis of the lens housing.

11. A lens housing as described in claim 9, wherein the aperture member is comprised of a flat plate portion extending perpendicular to the optical axis of the lens housing.

12. A lens housing as described in claim 9, wherein:
    the guide structure is comprised of at least one elongated guide member having its axis of elongation parallel to the optical axis of the lens housing; and
    the aperture member includes:
       an aperture in a plane perpendicular to the optical axis of the lens housing, and
       an opening for receiving the elongated guide member.

13. A lens housing as described in claim 9, wherein:
    the guide structure is comprised of a plurality of elongated guide members having their respective axes of elongation parallel to the optical axis of the lens housing.

14. A lens housing as described in claim 13, wherein the aperture member is comprised of:
    a flat plate having an aperture therein, the plate extending in a plane perpendicular to the optical axis of the lens housing, and
    a plurality of openings for receiving the elongated guide members.

15. A lens housing as described in claim 9, wherein the aperture member is secured directly to a surface of the optical member.

16. A lens housing as described in claim 9, wherein the aperture member is supported by the guide structure on a subject-side of the optical assembly.

17. An optical assembly comprised of:
    an optical member having an optical axis;
    a guide structure for driving the optical member along the optical axis; and
    an aperture member supported at a fixed distance by the optical member such that the aperture member remains at the fixed distance from the optical member as the optical member is driven along the optical axis.

18. An optical assembly as described in claim 17, wherein:
    the guide structure is comprised of a plurality of elongated guide members, each having a first and a second end, with the respective first ends being attached directly to the optical member, and having their respective axes of elongation extending parallel to the optical axis of the optical member.

19. An optical assembly as described in claim 18, wherein the aperture member is secured directly to a surface of the optical member,
    and includes an aperture extending perpendicular to the optical axis of the optical member.

20. An optical assembly as described in claim 17, wherein the aperture member is secured directly to a surface of the optical member.

21. An optical assembly as described in claim 17, wherein the aperture member is supported by the guide structure on a subject-side of the optical assembly.

\* \* \* \* \*